(12) United States Patent
De Mendonça Fava et al.

(10) Patent No.: US 6,918,239 B2
(45) Date of Patent: Jul. 19, 2005

(54) PROCESS OF AND A DEVICE FOR RELATIVE POSITIONING BETWEEN AN AGRICULTURAL MACHINE AND CROPS ON THEIR PLANTING ROWS

(75) Inventors: João Francisco De Mendonça Fava, Pompéia (BR); Edson Lucio Domingues, Pompeia (BR); Roy Scudder, Ribeirao Preto (BR)

(73) Assignee: Maquinas Agricolas Jacto S.A., Pompeia-SP (BR)

( * ) Notice: Subject to any disclaimer, the term of this patent is extended or adjusted under 35 U.S.C. 154(b) by 59 days.

(21) Appl. No.: 10/656,426

(22) Filed: Sep. 5, 2003

(65) Prior Publication Data

US 2004/0060272 A1 Apr. 1, 2004

Related U.S. Application Data

(63) Continuation-in-part of application No. 10/371,331, filed on Feb. 21, 2003.

(30) Foreign Application Priority Data

Feb. 22, 2002 (BR) .............................................. 0200591
Nov. 11, 2002 (BR) ....................................... C1-0200591

(51) Int. Cl.$^7$ ............................................. A01D 46/00
(52) U.S. Cl. ................................................... 56/328.1
(58) Field of Search ............................. 56/340.1, 328.1, 56/10.2 R, 10.2 D, 10.2 E, 10.2 F, DIG. 2, DIG. 15

(56) References Cited

U.S. PATENT DOCUMENTS

| | | | | | |
|---|---|---|---|---|---|
| 2,805,612 | A | * | 9/1957 | Beard | 172/79 |
| 3,866,402 | A | * | 2/1975 | Block | 56/377 |
| 4,173,110 | A | * | 11/1979 | Hansen, Jr. | 56/10.2 R |
| 4,341,062 | A | * | 7/1982 | Scudder | 56/330 |
| 4,975,016 | A | * | 12/1990 | Pellenc et al. | 414/501 |
| 6,155,036 | A | * | 12/2000 | Pellenc | 56/328.1 |
| 6,178,730 | B1 | * | 1/2001 | Visser | 56/340.1 |
| 6,360,518 | B1 | * | 3/2002 | Scott et al. | 56/328.1 |

* cited by examiner

Primary Examiner—Thomas B. Will
Assistant Examiner—Alicia Torres
(74) Attorney, Agent, or Firm—Michael J. Striker

(57) ABSTRACT

For relative positioning between an agricultural machine and crops on their planting rows a sensor is arranged forwardly of a sensor of a rotor of an agricultural machine and at a distance which is at least equal to or greater than a top radius of trees to be worked with the radius being measured in a planting row direction, the tree top by the sensor to determine a rearward point, a forward point, a center point and a farthest transverse point from the center point of a tree top, and the rotor is adjusted to define a trajectory of the rotor center with respect to the points, whereupon the steps are repeated for each of the trees in the planting row to be worked.

10 Claims, 2 Drawing Sheets

PROCESS OF AND A DEVICE FOR RELATIVE POSITIONING BETWEEN AN AGRICULTURAL MACHINE AND CROPS ON THEIR PLANTING ROWS

CROSS-REFERENCE TO A RELATED APPLICATION

This application is a continuation-in-part of U.S. patent application Ser. No.: 10/371,331, filed Feb. 21, 2003.

BACKGROUND OF THE INVENTION

The present invention relates to a process of and a device for relative positioning between an agricultural machine and crops on their planting rows.

Such process and device are disclosed in our previous patent application Ser. No. 10/371,331. This application discloses a process and device for relative positioning between agricultural machines and crops on their planting rows, which are efficient in performing their corresponding functions. It is believed that the above-mentioned process and device can be further improved.

SUMMARY OF THE INVENTION

Accordingly, it is an object of the present invention to provide an improved process of and device for relative positioning between agricultural machines and crops on their planting rows.

Accordingly, it is an object of the present invention to provide an alternative for possible trajectory standards that the harvest device must follow to improve the reach of all top half being worked.

It is also an object of the present invention to provide a process and device of relative positioning between agricultural machines and crops on their planting rows that would allow to position, for example, an active harvest element on a preset and desired position for that situation of harvest and besides continue to keep and correct this position in the course of the work.

It is also another object of the present invention to provide a process and device of relative positioning between agricultural machines and crops on their planting rows that would allow to determine a desired work position.

It is a further object of the present invention to provide a process and device of relative positioning between agricultural machines and crops on their planting rows, whose position of this trajectory in relation to the ground would be set by the operator, allowing rotor or other service equipment to operate always on the same positions of the trees tops disposed on the planting row at a present distance.

It is also an object of the present invention to provide a process and device of relative positioning between agricultural machines and crops on their planting rows that simultaneously in its harvest work would follow eventual changes in the form and external relief of the top in order to achieve its higher efficiency of work and/or still place itself in relation to the points where the fruits are more concentrated.

It is further an object of the present invention to provide a process and device of relative positioning between agricultural machines and crops on their planting rows that would promote relative positioning only on one side of the tree top being worked which would be determined by a vertical plan that would pass through the planting rows of the same in the place.

It is another object of the present invention to provide a process and device of relative positioning between agricultural machines and crops on their planting rows that would perform a consecutive work on the same sides of trees disposed in planting rows.

It is also an object of the present invention to provide a process and device of relative positioning between agricultural machines and crops on their planting rows that would allow an individualized work for each tree top, and said work is carried out automatically, without the operator's interference, except when setting initial parameters of work and when deciding to change them eventually.

It is a further object of the present invention to provide a process and device of relative positioning between agricultural machines and crops on their planting rows that could be adapted to the different tops types, whether they tend to be conical, cylindrical or spherical, and also to the different types of spacing between trees existing on planting rows.

It is still a further object of the present invention to provide a process and device of relative positioning between agricultural machines and crops on their planting rows that would allow to accommodate automatically the lateral inclination of the rod supporting column through two actuators controlled by the processor, based on the sensing data received.

It is also an object of the present invention to provide a process and device of relative positioning between agricultural machines and crops on their planting rows that would promote an adjustment of the lateral inclination of the rod supporting column through an actuator manually actuated by the operator, and this actuator is placed on the upper part of the rotor supporting structure.

It is also an object of the present invention to provide a process and device of relative positioning between agricultural machines and crops on their planting rows that to sense the tree tops would use one or more sensors, depending on the top form and/or the vegetation type in question, and even the sensing type desired.

It is also an object of the present invention to provide a process and device of relative positioning between agricultural machines and crops on their planting rows that could also be applied to the trees upper part by similar elements to those hereinabove described, convniently placed on the tops and horizontally positioned substantially where the same sensing, moving and displacement characteristics described would be applied to use on the upper part of the tops.

It is also further an object of the present invention to provide a process and device of relative positioning between agricultural machines and crops on their planting rows that could be used mounted, trailed or self-propelled bearer vehicle, working one side of the trees at a time or working entire plants at a time by passing over the same.

The process in accordance with the present invention includes the stages of determining the positioning of each tree on the planting row, the rotor position in relation to the chassis that bears the machine and simultaneously the traveling speed of the agricultural machine; sending data of tree positioning and machine speed to the processor; processing data and controlling servomachines that actuate the actuators that, in turn, position the rotor column according to the position and form of the tree top. In turn, the device of relative positioning between agricultural machines and crops on their planting rows is comprised of, at least, one position sensor disposed on the agricultural machine before the rotor column where the stripping rods are placed; being still foreseen a travelling speed sensor for the agricultural machine; and being said sensors electrically connected to a data processor which, in turn, is electrically connected to servomechanisms that act with mechanical, hydraulic, pneumatic and electric actuators that move the rotor shaft to a near and predetermined position of the tree contour. In order to have control over the rotor position and displacement, there still is a rotor position sensor in relation to the machine chassis.

In accordance with the present invention the process includes the stages arranging a sensor forwardly of a sensor of a rotor of an agricultural machine and at a distance which is at least equal to or greater than a top radius of trees to be worked with the radius being measured in a planting row direction; sensing the tree top by the sensing means to determine a rearward point, a forward point, a center point and a farthest from the center point of a tree top; and adjusting the rotor to define a trajectory of the rotor center with respect to said points; and repeating said steps for each of the trees in the planting row to be worked.

In accordance with the present invention a device for relative positioning between agricultural machines and crops and their planting rows is proposed, which includes arranging a sensor forwardly of a sensor of a rotor of an agricultural machine and at a distance which is at least equal to or greater than a top radius of trees to be worked with the radius being measured in a planting row direction; sensing the tree top by the sensing means to determine a rearward point, a forward point, a center point and a farthest from the center point of a tree top; and adjusting the rotor to define a trajectory of the rotor center with respect to said points; and repeating said steps for each of the trees in the planting row to be worked.

While the type of trajectory defined in the above mentioned patent application Ser. No. 10/371,331 is considered good, the present invention further improves such trajectory regarding the efficiency of the work on the top.

A similar principle disclosed in the above mentioned patent application is utilized in the invention disclosed in this patent application; however the sensing moment must necessarily be more ahead in relation to the tree end, as well as other features are provided.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
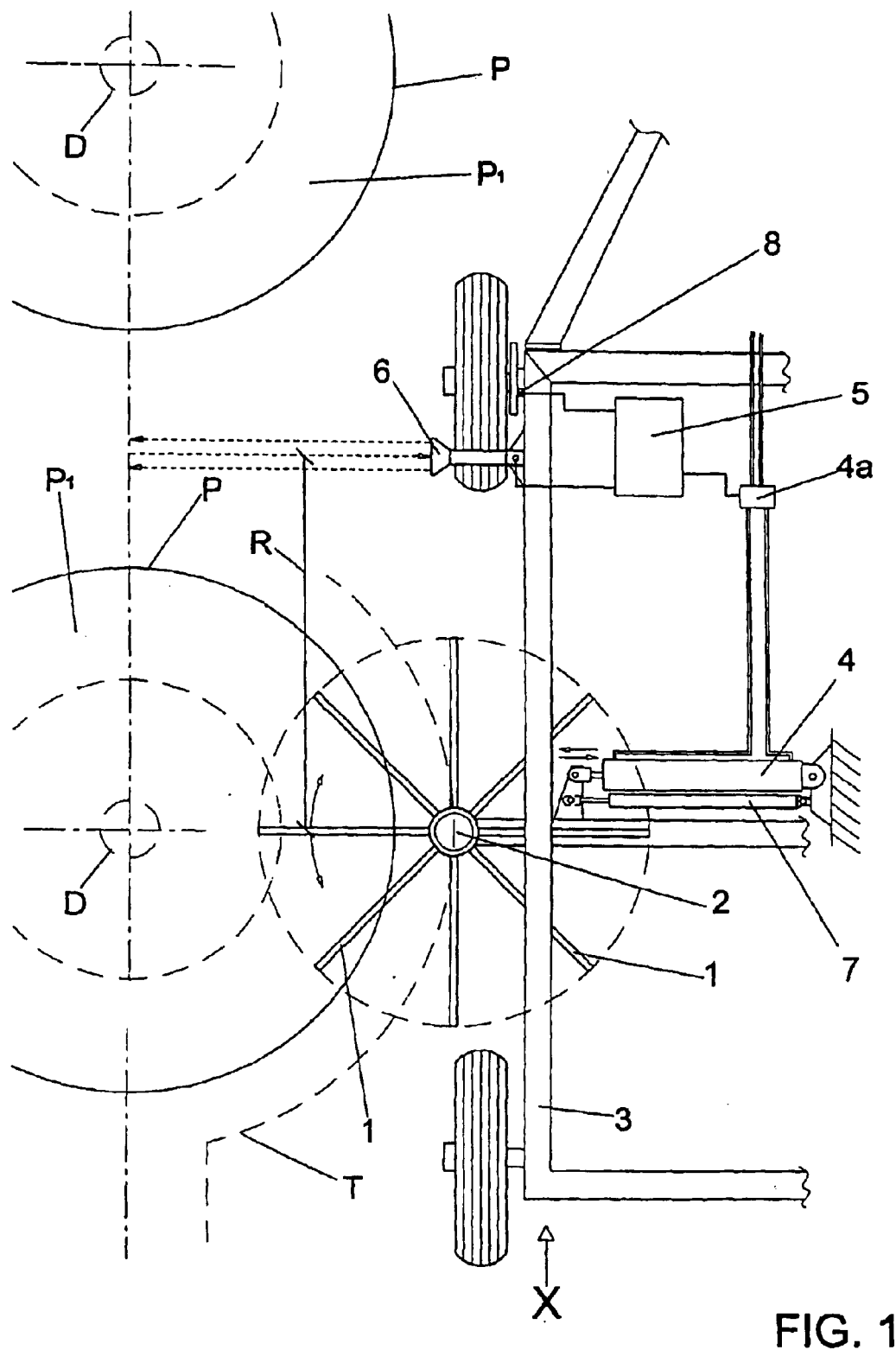
FIG. 1 is a schematic plan view of an agricultural implement provided with a device for relative positioning between agricultural machines and crops on their planting rows for acting on one of tree top sides, in accordance with the present invention.

In accordance with the process and device of positioning between agricultural machines and crops on their planting rows in accordance with the present invention; a relative position of the sensor(s) that must be ahead of the rotor or active parts and the distance (R) between the sensor or sensors and the rotor must be always longer than the tree radius. This will allow that the sensor(s) have opportunity to act over all the tree top before the rotor reaches the half of the top, the part most ahead toward the machine.

The device of relative positioning between agricultural machines and crops on their planting rows is illustrated on a harvesting machine whose construction is not part of the scope of the invention, therefore it will not be described in detail.

The positioning device has its preferential application on a fruit harvest. It has vibratory rods (1) mounted on a rotor (2) supported by a chassis (3), and the rotor (2) is subject to displacing in relation to the chassis (3) through actuators (4). The positioning device includes an electro-electronic processor (5) that is supplied with information obtained by a position sensor (7) of the rotor (2) disposed on the chassis (3), a top position sensor (6) also disposed on the chassis (3) before the rotor (2) in such way so as to sense the form and position of the fruits concentration area (PI) of the trees top (P) to be worked, and a machine displacement speed sensor (8). The electronic processor (5), in turn, controls the actuator (4) based on the data received by the different sensors.

This electronic processor (5) analyzes the distance from the tree top (P) in relation to the harvest device; the rotor relative position in relation to the chassis; the working speed; the position and form of the tops (P); additional adjustments introduced by the operator and other inherent data to the processing system required by the processor (5), to then actuate the actuators (4) to position the rotor (2) with its rods (1) at a preset distance from the trees top (P).

When the agricultural machine is moving, the sensors (6) act signaling the section of tree top (P) at the height of its installation point next to the chassis (3), sending to the processor (5) the tree area which one desires rods (1) of the rotor (2) to act. Thus, all planting row along a determined trajectory (T) is mapped by the tops (P) position sensors (6), so that the travel of the center of the rotor (2) is modified by the data processor (5) through actuators (4). In the absence of one or more trees on the planting row, detected by the sensor (6), the rotor (2) will remain on standby at the maximum distance at its position. It will maintain this position while there is no new tree. With the approach of a new tree, a new following trajectory for the rotor (2) will reinitiated. Therefore, the trajectory followed by the rotor (2) in the region among the trees (P) reaches the end on its distention course defined by the actuators (4), in such a way that, at this point, this is the most distance position from the chassis (3) and the rotor (2) takes after performing its work over a tree (P) and before initiating the next tree (P).

Figure 2:
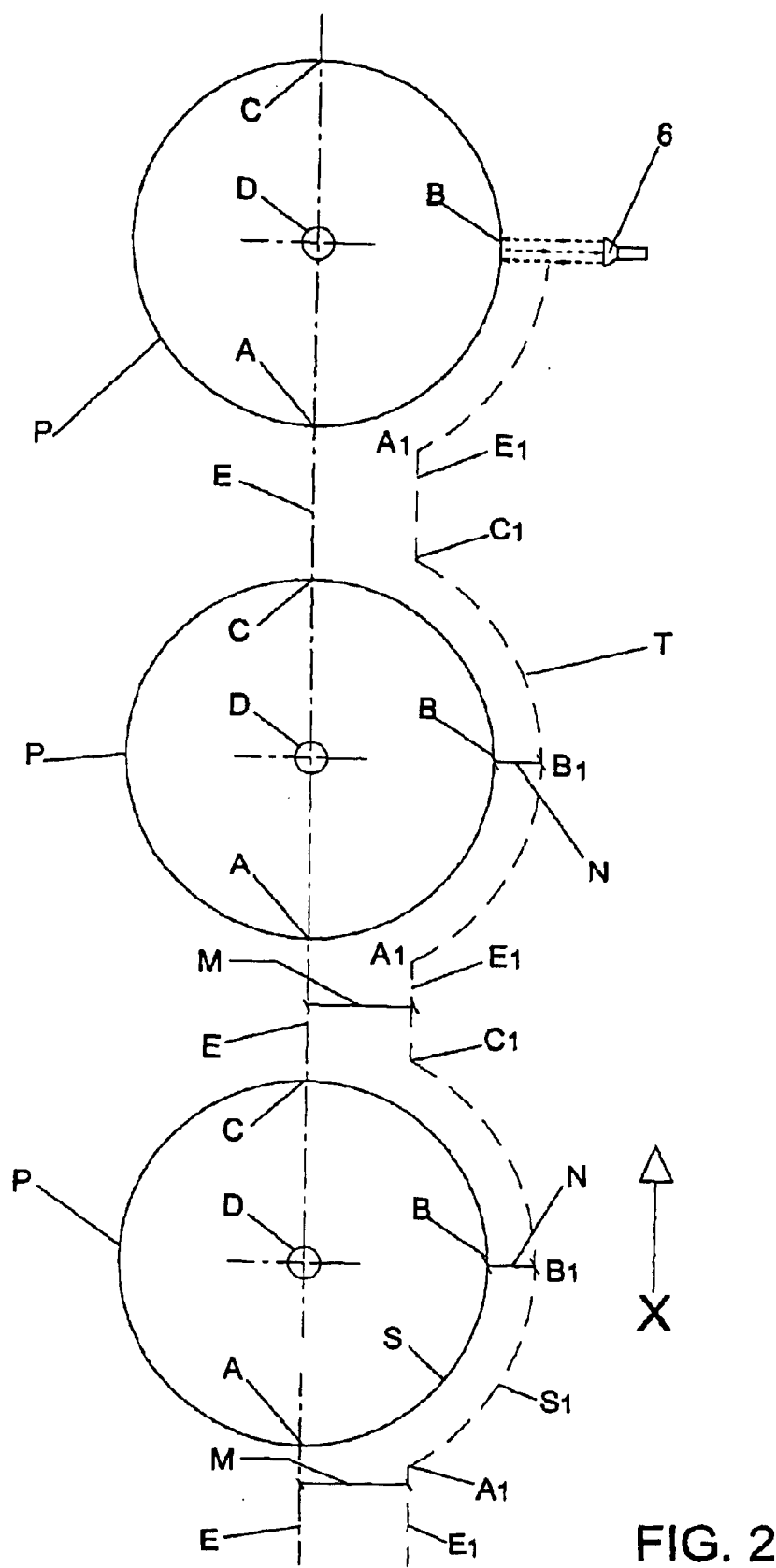
FIG. 2 is a schematic plan view of an alignment of trees where there tops show the planting position and the dotted line determines the trajectory determined by a processor as the path for the active element base center or as in the example used to the stripping machine column base center.

As one can see in the FIG. 2, three basic points (A), (B) and (C) defined the tree top (P)perimeter and three correspondent points (A1), (B1) and (C1) on the rotor trajectory (T) are presented as characteristics on the tree top. One still defines as (S) and (S1) respectively the top perimeter part between (A) and (C) and the rotor trajectory part between (A1) and (C1). The point (D) represents the trees center and the letter (E), measured in the planting row direction, represents the planting row between the tops; in the same manner (E1) represents the planting row part along the trajectory (T) corresponding to the letter (E).

As these points are determined in the FIG. 2, one has as follows: (A) represents the tree beginning; (B) represents the part that is most ahead of the top toward the center between tree rows; and (C) represents the tree end. The basic point (A) can be defined as a rearward point, the basic (B) can be defined as a forward point and the basic (C) can be defined as a point which has a maximum transverse distance from the tree center point (D). The distance (N) from (B) to (B1) represents the distance between the rotor center and the top. This distance can be changed by the operator to adjust to the work. At least, the point (D) that represents the tree center, close to the ground, is the intermediate referential that is in the planting row between the points (A) and (C).

As shown in FIGS. 1 and 2, to do the trees (P) contour, one considers the rotor (2) displacement in the direction of the arrow (X). With this displacement, the center of the rotor (2), in the absence of trees, describes its trajectory over the line (E1) parallel to the line (E) and at a distance (M) from the same, see FIG. 2. This distance must be such that the rotor active parts can fully reach the region around the points (A) and (C) of the trees (P) tops. This way, the ends of the stripping rods (1), at this moment, must necessarily be a little ahead toward the other side of the planting row in order to work as desired. Thus, when the rotor center reaches the point (A1) at a distance of value (N) from the top and of value (M) from the planting row (E), it is possible to treat all region of the top around the point (A), as shown in FIG. 2.

Starting from the point (A1), the center of the rotor (2) contours the tree (P) top according to a trajectory established by the processor. This trajectory does not take into account irregularities or local discontinuities, but does follow a trajectory said "corrected curve" to avoid excessive and unnecessary correction movements. The center of the rotor (2) displaces itself along the trajectory (T) until reaching the point (B1). This movement from (A1) to (B1) is made according to the combination of two displacements, which are: one to stand back of the planting row and the other of the parallel displacement of the machine (3) in relation to the planting row, this movement being such that the rotor center (2) countours the tree (P) top, however without hitting the same. During all the displacement around the top, the processor will try to keep the center of the rotor (2) at a distance (N) from the top (P).

Being the center of the rotor (2) on the point (B1), its distance in relation to the point (B) must present a value (N), so a new curve trajectory toward point (C1) is initiated, always trying to keep itself a distance (N) from the top (P). When reaching the point (C), the center of the rotor (2) is at a distance (M) from the planting row and, therefore, the active parts are in conditions to work the area around the point (C), as desired and in the same manner as occurred with the point (A).

With the harvest (3) displacement, the center of the rotor (2) displaces itself parallel to and at a distance (M) from the planting row until reaching a distance (N) from the following tree top (P), when a new cycle similar to the one described above will begin, see FIG. 2.

The process and device of relative positioning between agricultural machines and crops on their planting rows of the invention, the concept consists of providing sensors (6) placed before the center of the rotor (2) and at a distance (R), at least equal or bigger than the trees top (P) radius to be worked, being said radius measured in the planting row direction; and the referentials taken by the sensors (6) for definition of the trajectory (T) of the center of the rotor (2) are defined by the points (A), (B), (C) and (D) of the trees and still the planting row. This procedure and definition of a trajectory (T) are carried out for each tree top (P) to be worked.

With this concept in the inventive process and device of relative positioning between agricultural machines and crops on their planting rows, it is possible to locate different parameters (A), (B) and (C) of the trees and still to determine the planting row and, eventually, the exact position of the tree (P) center (D). With this development, it is possible for the processor to carry out an interpolation between the top points found by sensing and, from the same, to establish a curve (T) to be followed by the center of the rotor (2), with as less irregularities as possible.

It will be understood that each of the elements described above, or two or more together, may also find a useful application in other types of constructions and methods differing from the types described above.

While the invention has been illustrated and described as embodied in a process of relative positioning between an agricultural machine and crops on their planting rows, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process of relative positioning between an agricultural machine and crops on their planting rows, comprising the steps of arranging sensing means forwardly of a center of a rotor of an agricultural machine and at a distance which is at least equal to or greater than a top radius of trees to be worked with the radius being measured in a planting row direction; sensing the tree top by the sensing means to determine a rearward point, a forward point, a center point and a farthest transverse point from the center point of a tree top; and adjusting the rotor to define a trajectory of the rotor center with respect to said points; and repeating said steps for each of the trees in the planting row to be worked; and processing data obtained from said sensing means about said points of the tree top so as to provide an interpolation of the points of the tree top and to establish a curve to be followed by the rotor center with as less irregularities as possible.

2. A process as defined in claim 1, and further comprising placing the rotor center at a distance from the farthest transverse point of the tree top; maintaining the distance along an entire trajectory during following of the tree top; and maintaining a predetermined distance between the true tops at a predetermined value in relation to the planting row.

3. A process as defined in claim 1; and further comprising displacing the rotor between two consecutive tree tops at a parallel trajectory and at a predetermined distance from the planting row; contouring the tree top over a trajectory starting at a rearward point and ending at a forward point at a distance from the tree top; and selecting the distances such that rod ends of the rotor are on another side of the planting row during displacement in a space between two consecutive trees so as to fully reach regions around the rearward point and the forward point of the tree top.

4. A process of relative positioning between an agricultural machine and crops on their planting rows, comprising the steps of arranging sensing means forwardly of a center of a rotor of an agricultural machine and at a distance which is at least equal to or greater than a top radius of trees to be worked with the radius being measured in a planting row direction; sensing the tree top by the sensing means to determine a rearward point, a forward point, a center point and a farthest transverse point from the center point of a tree top; and adjusting the rotor to define a trajectory of the rotor center with respect to said points; and repeating said steps for each of the trees in the planting row to be worked; and establishing a trajectory to be followed by the rotor center to contour the tree top, by a processor which does not consider local irregularities or discontinuities but follows a trajectory to avoid excessive and unnecessary correction movements made by a combination of a first displacement to stand back of the planting row and a second displacement of the agricultural machine parallel to the planting row, so that the rotor center contours the tree top but does not hit the tree top.

5. A process of relative positioning between an agricultural machine and crops on their planting rows, comprising the steps of arranging sensing means forwardly of a center of a rotor of an agricultural machine and at a distance which is at least equal to or greater than a top radius of trees to be worked with the radius being measured in a planting row direction; sensing the tree top by the sensing means to determine a rearward point a forward point, a center point and a farthest transverse point from the center point of a tree top; and adjusting the rotor to define a trajectory of the rotor center with respect to said points; and repeating said steps for each of the trees in the planting row to be worked; and determining the position of the top center point in a sequence of the trees of the planting row by analyzing a sequence of the rearward point, the forward point and the farthest transverse point of the tree top of a given planting row; checking the position and correcting the position from time to time with arrival of new rearward, forward and farthest transverse points, and defining a planting row between the tree tops from the tree tops center points resulting from evaluation of the sequence of the rearward, forward and farthest transverse points.

6. A device for relative positioning between an agricultural machine and crops on their planting rows, comprising sensing means arranged forwardly of a sensor of a rotor of an agricultural machine and a distance which is at least equal or greater than a top radius of trees to be worked with the radius being measured in a planting row direction and sensing the tree top by the sensing means to determine a rearward point, a forward point, a center point and a farthest transverse point from the centerpoint of a tree top; and means for adjusting the rotor to define a trajectory of the rotor center with respect to said points, whereupon said steps are repeated for each of the trees in the planting row to be worked; and means for processing of data obtained from said sensing means about said points of the tree top so as to provide an interpolation of the points of the tree top and to establish a curve to be followed by the rotor center with as less irregularities as possible.

7. A device as defined in claim 6, and further comprising means for placing the rotor center at a distance from the farthest transverse point of the tree top, maintaining the distance along an entire trajectory during following of the tree top, and maintaining a predetermined distance between the tree tops at a predetermined value in relation to the planting row.

8. A device as defined in claim 6; and further comprising means for displacing the rotor between two consecutive tree tops at a parallel trajectory and at a predetermined distance from the planting row, contouring the tree top over a trajectory starting at a rearward point and ending at a forward point at a distance from the tree top, and selecting the distances such that rod ends of the rotor are on another side of the planting row during displacement in a space between two consecutive trees so as to fully reach regions around the rearward point and the forward point of the tree top.

9. A device for relative positioning between an agricultural machine and crops on their planting rows, comprising sensing means arranged forwardly of a sensor of a rotor of an agricultural machine and at a distance which is at least equal to or greater than a top radius of trees to be worked with the radius being measured in a planting row direction and sensing the tree top by the sensing means to determine a rearward point, a forward point, a center point and a farthest transverse point from the center point of a tree top; and means for adjusting the rotor to define a trajectory of the rotor center with respect said points, whereupon said steps are repeated for each of the trees in the planting row to be worked; and means for establishing a trajectory to be followed by the rotor center to contour the tree top, by a processor which does not consider local irregularities or discontinuities but follows a trajectory to avoid excessive and unnecessary correction movements made by a combination of a first displacement to stand back of the planting row and a second displacement of the agricultural machine parallel to the planting row, so that the rotor center contours the tree top but does not hit the tree top.

10. A device for relative positioning between an agricultural machine and crops on their planting rows, comprising sensing means arranged forwardly of a sensor of a rotor of an agricultural machine and at a distance which is at least equal to or greater than a top radius of trees to be worked with the radius being measured in a planting row direction and sensing the tree top by the sensing means to determine a rearward point, a forward point, a center point and a farthest transverse point from the center point of a tree top; and means for adjusting the rotor to define a trajectory of the rotor center with respect to said points, whereupon said steps are repeated for each of the trees in the planting row to be worked; and means for determining the position of the top center point in a sequence of the trees of the planting row by analyzing a sequence of the rearward point, the forward point and the farthest transverse point of the tree top of a given planting row, checking the position and correcting the position from time to time with arrival of new rearward, forward and farthest transverse points, and defining a planting row between the tree tops from the tree tops center points resulting from evaluation of the sequence of the rearward, forward and farthest transverse points.

* * * * *